United States Patent [19]
Yoshimi et al.

[11] Patent Number: 5,732,327
[45] Date of Patent: Mar. 24, 1998

[54] METHOD FOR AUTOMATIC CREATION OF PERIPHERAL ZONE INFORMATION

[75] Inventors: Masaaki Yoshimi, Fujisawa; Kiyohito Nagata; Kazuhiko Kakinuma, both of Yokohama; Tatsuaki Wakabayashi, Yokosuka, all of Japan

[73] Assignee: NTT Mobile Communications Network Inc., Tokyo, Japan

[21] Appl. No.: 574,897

[22] Filed: Dec. 19, 1995

[30] Foreign Application Priority Data

Dec. 28, 1994 [JP] Japan ................. 6-327793

[51] Int. Cl.⁶ .................................... H04B 17/00
[52] U.S. Cl. ................. 455/67.1; 455/433; 455/437; 455/446; 455/525
[58] Field of Search .................... 455/418, 419, 455/422, 433, 423, 437, 446, 436, 67.1, 62, 448, 525, 524, 434–435

[56] References Cited

U.S. PATENT DOCUMENTS

| | | | |
|---|---|---|---|
| 5,095,500 | 3/1992 | Tayloe et al. | 379/32 |
| 5,101,501 | 3/1992 | Gilhousen et al. | 455/33 |
| 5,179,722 | 1/1993 | Gummar et al. | 455/33.1 |
| 5,293,640 | 3/1994 | Gummar et al. | 455/33.1 |
| 5,305,466 | 4/1994 | Taketsugu | 455/33.1 |
| 5,307,510 | 4/1994 | Gummar et al. | 455/67.1 |
| 5,577,022 | 11/1996 | Padovani et al. | 370/13 |
| 5,594,949 | 1/1997 | Andersson et al. | 455/62 |
| 5,613,217 | 3/1997 | Hagstrom et al. | 455/67.1 |

FOREIGN PATENT DOCUMENTS

| | | |
|---|---|---|
| 0 430 173 | 6/1991 | European Pat. Off. . |
| WO 92/06543 | 4/1992 | WIPO . |
| WO 92/10914 | 6/1992 | WIPO . |

*Primary Examiner*—Reinhard J. Eisenzopf
*Assistant Examiner*—Darnell R. Armstrong
*Attorney, Agent, or Firm*—Pollock, Vande Sande & Priddy

[57] ABSTRACT

Each base station measures the field intensity of downlink rediowaves from other base stations, then analyzes the received rediowaves above a predetermined field intensity value and decides whether they are rediowaves used in the same mobile radio communication system. The base station creates peripheral base station information based on information about the rediowaves decided as being used in the same mobile radio communication system.

9 Claims, 4 Drawing Sheets

| FREQ | FIELD | TYPE OF RADIOWAVE | PERIPHERAL DECISION |
|---|---|---|---|
| # 1 | 30db μV | SAME SYS | O |
| # 2 | 40db μV | DIFF SYS | X |
| # 3 | 32db μV | SAME SYS | O |
| # 4 | 38db μV | SAME SYS | O |
| # 5 | -5db μV | | X |
| # 6 | 0 db μV | | X |

O  FREQ # DECIDED AS PERIPHERAL
X  FREQ # DECIDED AS NOT PERIPHERAL

| FREQ | FIELD | TYPE OF RADIOWAVE | PERIPHERAL DECISION |
|---|---|---|---|
| #1 | 30 dbμV | SAME SYS | ○ |
| #2 | 40 dbμV | DIFF SYS | × |
| #3 | 32 dbμV | SAME SYS | ○ |
| #4 | 38 dbμV | SAME SYS | ○ |
| #5 | −5 dbμV |  | × |
| #6 | 0 dbμV |  | × |

○ FREQ # DECIDED AS PERIPHERAL
× FREQ # DECIDED AS NOT PERIPHERAL

METHOD FOR AUTOMATIC CREATION OF PERIPHERAL ZONE INFORMATION

BACKGROUND OF THE INVENTION

The present invention relates to a method for creating peripheral zone information to be sent by a base station of each zone in a mobile radio communication system reports to mobile stations in that zone.

In a mobile radio communication system, the service area is divided into a plurality of zones (cells), a radio base station is provided in each zone, through which a mobile station communicates with an other mobile station or a stationary communication terminal over a channel of a frequency assigned to the zone in which the mobile station is currently staying (the zone will hereinafter be referred to as visiting zone). With such a mobile radio communication system, the mobile station hands off (channel-switches) during conversation when it enters a new zone or when receiving conditions become worse although it stays in the same zone. Alternatively, the mobile station temporarily suspends communication and then resumes communication when it goes into a new zone. To effect reliable and fast control for such hand off (channel switching) during communication or re-connect type channel switching, the mobile station requires information about base stations of peripheral zones and their channel frequencies. To meet this requirement, the radio base station of each zone always broadcasts identification codes and/or channel frequencies of peripheral base stations, as broadcast information, to mobile stations in that zone over a control channel, for instance, thereby speeding up the control of their channel switching and achieving their appropriate zone switching. The control channel for broadcasting such peripheral zone information (which may also be called peripheral base station information) may sometimes be referred to as a perch channel.

With the expansion or reduction of the service area, a change in the traffic distribution in the area, a change in rediowave propagation environments or similar changes in peripheral environments, radio base stations are relocated, added or removed from service or the assignment of their channel frequencies is altered. When the channel frequencies of peripheral base stations are altered in accordance with a change in the peripheral environment, each base station needs to update the peripheral base station information to be broadcast over the perch channel. Conventionally, each radio base station (hereinafter referred to simply as a base station) measures the field intensity of rediowaves from other base stations by a receiving apparatus and an operator analyzes the received signals, collects and manages information of the peripheral base stations, then prepares the peripheral base station information to be broadcast and broadcasts it to mobile stations in the zone over the perch channel. Alternatively, the information is broadcast as a data transfer via a centralized control device.

Moreover, each base station obtains the information about the peripheral base stations by measuring field intensity of rediowaves radiated therefrom over a wide range and, based on the measured results, detects its positional relationship to the peripheral base stations. Hence, much labor and time are needed for the data collection.

SUMMARY OF THE INVENTION

It is therefore an object of the present invention to provide a method which permits automatic creation of peripheral zone information.

With the basic principles of the present invention, the field intensity of each received signal is measured to see if it is higher than a prescribed value, while at the same time the received signal is analyzed to see if it is a signal from a peripheral base station belonging to the same mobile radio communication system (that is, a system of the same service provider), and when the received signal has a field intensity above the prescribed value and belongs to the same mobile radio communication system, it is judged that the received channel frequency is one that has been assigned to a peripheral zone. In this instance, there are cases where the base station makes both the measurement and analysis, where a mobile station makes both the measurement and analysis and reports the results to the base station, where the mobile station makes the measurement and reports the measured results to the base station for analysis, and where the mobile station and the base station both make the measurement and analysis and the former reports the analyzed results to the latter.

According to a first aspect of the present invention, each base station measures the field intensity of downlink rediowaves from peripheral base stations to see if there is a downlink rediowave to the base station from a peripheral one. If such a rediowave exists, the base station analyzes the received signal to see if the rediowave is such one that is used in the same mobile radio communication system, that is, to see if the base station having radiated the rediowave is a base station peripheral to that having received the rediowave. Then, the base station automatically creates or updates peripheral base station information in recognition of the peripheral base station condition relative thereto.

According to a second aspect of the present invention, the mobile station makes above-mentioned analysis of the received signal in the first aspect and the base station creates or updates the peripheral base station information based on the results of analysis reported from the mobile station.

According to a third aspect of the present invention, the mobile station measures the field intensity of a downlink rediowave from a base station of a zone other than the mobile station's visiting zone and reports the measured results to the visiting zone base station. Then, the base station instructs the mobile station to analyze the received rediowave to see if it is a rediowave used in the same mobile radio communication system, and uses the analysis conclusions to create or update the peripheral base station information.

According to a fourth aspect of the present invention, the mobile station measures the field intensity of a downlink rediowave from a base station of a zone other than the mobile station's visiting zone, analyzes it to see if it is a rediowave used in the same mobile radio communication system. Thus, the mobile station recognizes the peripheral base station condition relative to the visiting zone base station, then reports thereto the peripheral zone information and creates or updates the peripheral base station information based on information sent from the visiting zone base station having received the peripheral base station information.

According to a fifth aspect of the present invention, upon entering a new zone, the mobile station measures the field intensity of downlink rediowaves from bases stations of the new and old zones and, based on the measured results, makes a check to determine if the old zone is peripheral to the new zone. If so, the mobile station reports the check conclusions to the base station of the new zone, which in turn creates or updates the peripheral base station information on the basis of the report.

According to a sixth aspect of the present invention, the mobile station reports the measured results to the base station of the new zone in the fifth aspect of the invention and the base station makes a check to determine the old zone is peripheral to the new zone and creates or updates the peripheral base station information.

According to a seventh aspect of the present invention, the second and third aspects of the invention are combined.

According to an eighth aspect of the present invention, the sixth aspect of the invention is further combined with the seventh aspect.

BRIEF DESCRIPTION OF THE INVENTION

DESCRIPTION OF THE PREFERRED EMBODIMENTS

Figures 1, 2:
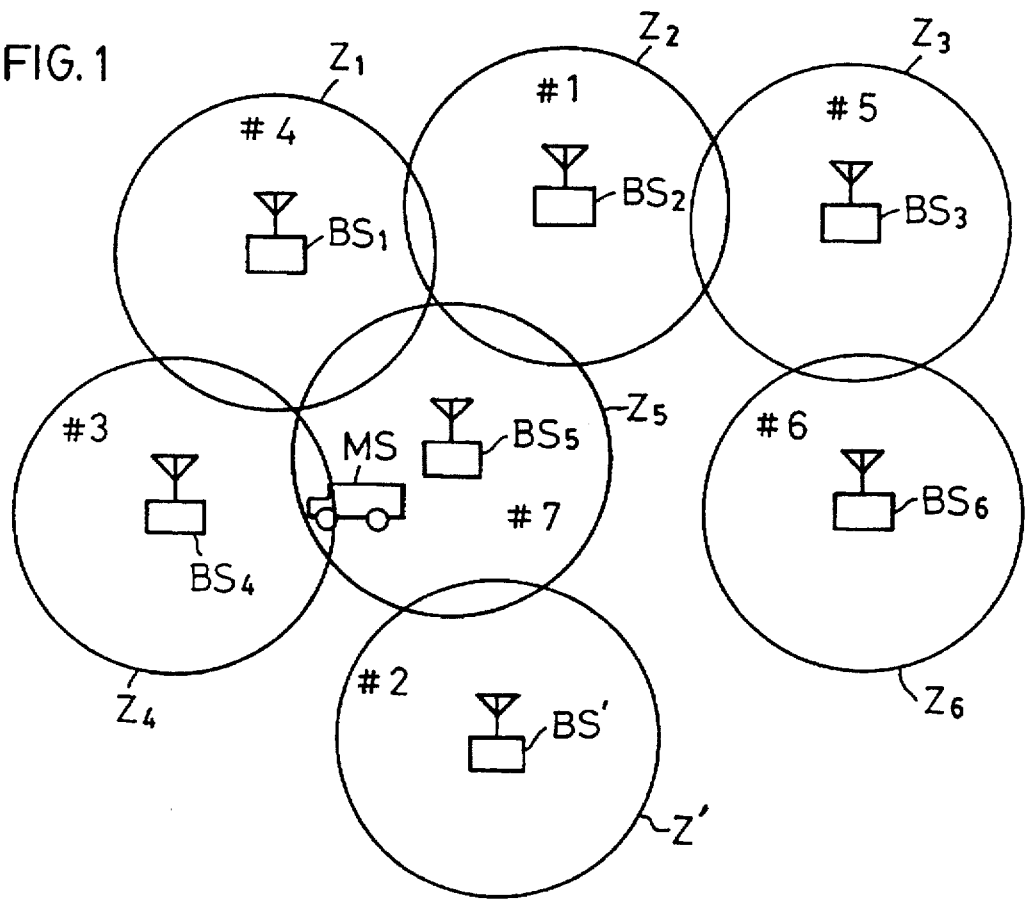
FIG. 1 is a diagram for explaining the zoning of the service area.
FIG. 2 is a table showing an example of peripheral base station information.

For example, as shown in FIG. 1, the service area is divided into a plurality of zones $Z_1, Z_2, Z_3, \ldots$, where base stations $BS_1, BS_2, BS_3, \ldots$ are provided, respectively. A mobile station MS communicates with another mobile station or a stationary terminal through the base station $BS_i$ (i=1, 2, ...) of the zone $Z_i$ where the mobile station is visiting (the zone is referred to as visited zone).

With the principles of the present invention, to acquire information about peripheral base stations, a check is made to determine if received signals of respective frequencies are signals received from base stations of peripheral zones in the same mobile radio communication system. That is to say, downlink rediowaves from other base stations are received and their field intensity is measured, and at the same time, the measured received signals are analyzed to see if they are signals sent from the base stations of the same mobile radio communication system (by the same system provider). When the received signal is determined to have a field intensity above a prescribed threshold value and belong to the same mobile radio communication system, the received signal is judged to have been transmitted from a peripheral base station.

The criteria of judgment listed below are used to determine if the received signal is one sent from a base station of the same mobile radio communication system.

The frequency of the received signal matches one of the frequencies used in the system.

The type of the received signal (a digital signal or not) is the same as that of signals used in the system and can be demodulated. This can easily be judged since different systems use different synchronizing signal configurations, for instance.

The modulation signal format (configuration) is the same as that used in the system.

If the received signal is one that has been broadcast over the perch channel, the communication system identification number contained in the broadcast signal is as predetermined.

When the received signal meets a predetermined one or more of such criteria, it is judged to be a signal sent from another base station belonging to the same communication system. These measurement and analysis are made on the downlink control channel, for example.

The measurement of the field intensity and the analysis of the received signal can be implemented in various forms; that is, there are cases where only the base station performs the measurement and the analysis, where each mobile station in the same zone performs the measurement and the analysis and the reports the results to the base station, and where the base station and the mobile station perform the measurement and the analysis in cooperation. These implementation patterns are also subdivided as described below.

Figure 3C:
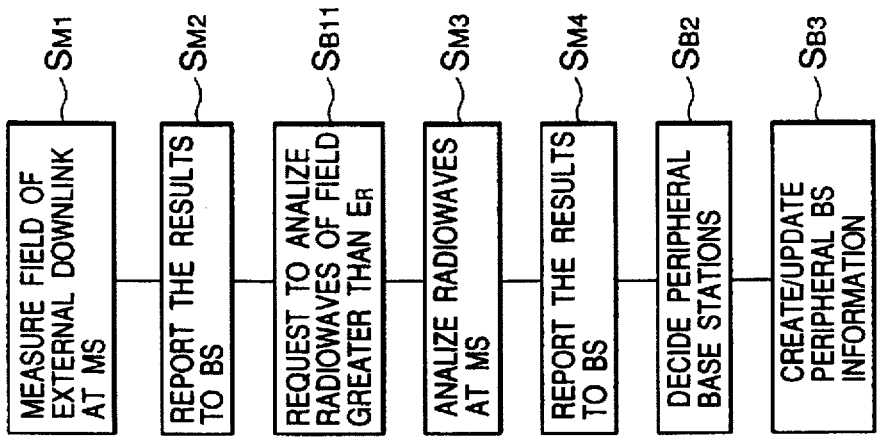
FIG. 3C is a flowchart showing the procedure of the method according to the third aspect of the present invention.
Figure 3B:
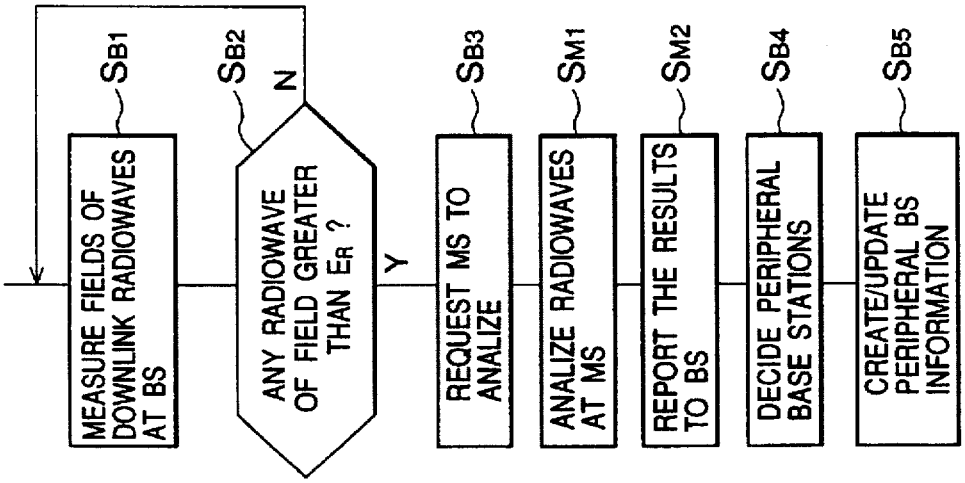
FIG. 3B is a flowchart showing the procedure of the method according to the second aspect of the present invention.
Figure 3A:
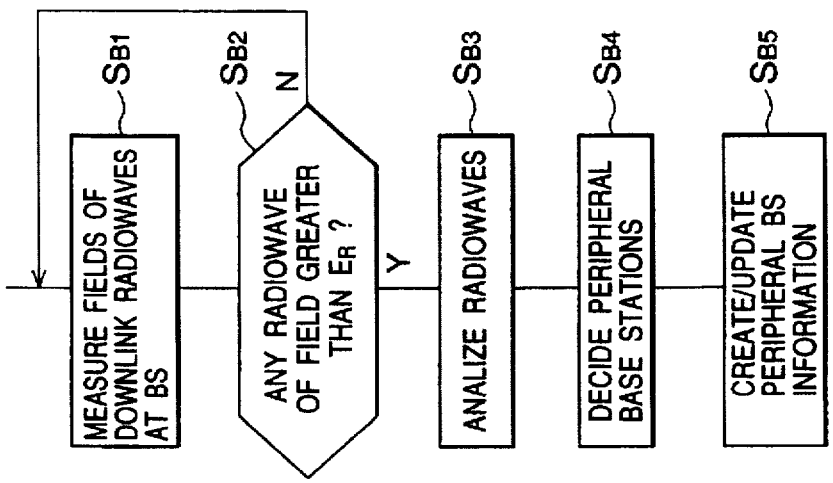
FIG. 3A is a flowchart showing the procedure of the method according to the first aspect of the present invention.

A. Where only the base station measures the field intensity and analyzes the received signal:

With the method according to the first aspect of the present invention, the base station $BS_i$ (i=1, 2, 3, ...) measures, by its transmitter/receiver, downlink rediowaves radiated from other base stations as shown in FIG. 3A. That is to say, the base station $BS_i$ sequentially receives rediowaves of all downlink channels frequencies (rediowaves transmitted by base stations to be received by mobile stations) in the frequency band assigned to the mobile radio communication system concerned and measures their field intensity ($S_{B1}$). The base station $BS_i$ checks the measured results for a rediowave whose field intensity is above a predetermined value $E_R$, that is, a rediowave of a field intensity that is considered to be a rediowave radiated from the base station adjacent the base station $BS_i$ ($S_{B2}$). If such a rediowave is found, the base station $SB_i$ receives it by the transmitter/receiver and analyzes the downlink rediowave on the afore-mentioned criteria to see if it is a rediowave radiated from another base station belonging to the mobile radio communication system common to the base station $BS_i$ ($S_{B3}$). In other words, the base station $BS_i$ analyzes the rediowave received at a reception level above a predetermined value as to whether it is receivable or acceptable as a control channel of the common mobile radio communication system. Based on the results of this analysis, the base station $BS_i$ decides whether the base stations having radiated the rediowave are peripheral base stations ($S_{B4}$) and creates the peripheral base station information ($S_{B5}$).

For example, as depicted in the table of FIG. 2, the field intensity of each of received downlink radiowave frequencies (channels) #1, #2, ... is recorded and the rediowaves of the field intensity above the predetermined value $E_R$ are classified as rediowaves of the same or different communication system; furthermore, the rediowave of the field intensity above the prescribed value $E_R$ and of the same system are recorded as rediowaves from peripheral (adjacent) base stations (indicated by white circles) and the other remaining rediowaves are recorded as not those from the peripheral base stations (indicated by crosses).

Where the number of peripheral base stations is predetermined, the predetermined number of base stations of the same system and having radiated rediowaves of the field intensity above the prescribed value $E_R$ are determined as peripheral base stations in descending order of field intensity. In this way, each base station $BS_i$ creates or updates the peripheral base station information.

Shown in the table of FIG. 2 is the peripheral base station information created by the base station $BS_5$ of the zone $Z_5$ in FIG. 1. In this example, three base stations $BS_1$ (frequency#4), $BS_2$ (frequency #1) and $BS_4$ (frequency #3) of the same system whose rediowaves have the field intensity above the predetermined value are decided as peripheral or adjacent to the base station $BS_5$; the base stations $BS_3$ (frequency #5) and $BS_6$ (frequency #6) belong to the same system as does the base station $BS_5$ but are not decided as adjacent to the latter; and the base station BS' (frequency #2) of the zone Z', though spatially close to the base station $BS_5$, belongs to a different system, and hence is not regarded as peripheral to the base station $BS_5$.

Such peripheral base station information is created not only upon setting up a mobile radio communication system and upon adding base stations but also periodically after starting the operation of the system so as to cope with changes in the radiowave propagation environment when a large building or tower is put up or pulled down.

B. Where the base station measures the field intensity of rediowaves and the mobile station analyzes the received signals:

The method according to the second aspect of the present invention is common to the FIG. 3A embodiment in that the base station $BS_i$ measures the field intensity of the downlink rediowaves ($S_{B1}$) and makes a check to see if the field intensity is above the predetermined value $E_R$ ($S_{B2}$) as shown in FIG. 3B. According to the second aspect of the invention, however, the base station $BS_i$ requests the mobile station MS in the same zone to analyze to see if rediowaves of the field intensity above the predetermined value $E_R$ are rediowaves of the mobile radio communication system common to the base station $BS_i$ ($S_{B3}$). Upon receiving the request, the mobile station MS receives and analyzes the specified downlink rediowaves to see if they are rediowaves of the communication system common to or different from the mobile station MS or noise rediowaves, following the aforementioned criteria of judgment such as whether the downlink rediowaves can be received as downlink control channels, or whether the channel can be switched to a designated downlink rediowaves (communication channel) through use of control channel ($S_{M1}$) when switching the zones. The mobile station MS reports the results of the analysis to the base station $BS_i$ having made the request ($S_{M2}$). The base station $BS_i$ uses the report to judge if the base stations having radiated the rediowaves are peripheral base stations ($S_{B4}$) and then creates or updates the peripheral base station information ($S_{B5}$).

C. Where the mobile station measures the field intensity of received rediowaves and analyzes the rediowaves specified by the base station:

With the method according to the third aspect of the present invention, the mobile station MS measures the field intensity of rediowaves of other frequencies than the downlink channel frequency of the base station $BS_i$ of the mobile station's visiting zone $Z_i$ ($S_{M1}$) and reports the measured results to the visiting zone base station $BS_i$ ($S_{M2}$). Based on the reports, the base station $BS_i$ lists the frequencies at which rediowaves are considered to be arriving, then uses the list to make a check to determine if the rediowaves can be analyzed using the measured field intensity, and requests the mobile station MS to analyze the rediowaves judged analyzable ($S_{B1}$). The mobile station MS receives the specified rediowaves and, if they can be received, analyzes them to see if they are rediowaves radiated from base stations of the same mobile radio communication system ($S_{M3}$) and reports the analyzed results to the base station $BS_i$ ($S_{M4}$). The base station $BS_i$ uses the report to decide as to whether the base stations are peripheral ones ($S_{B2}$) and creates or updates peripheral base station information ($S_{B3}$).

Figure 4C:
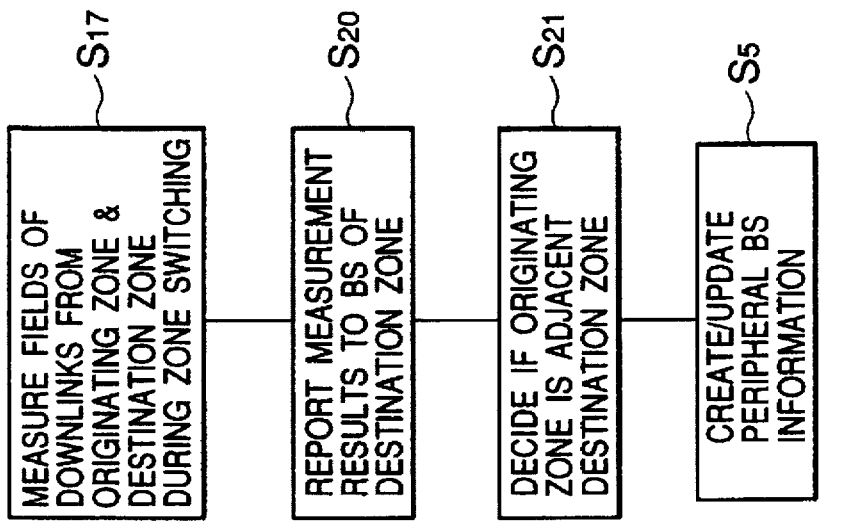
FIG. 4C is a flowchart showing the procedure of the method according to the sixth aspect of the present invention.
Figure 4B:
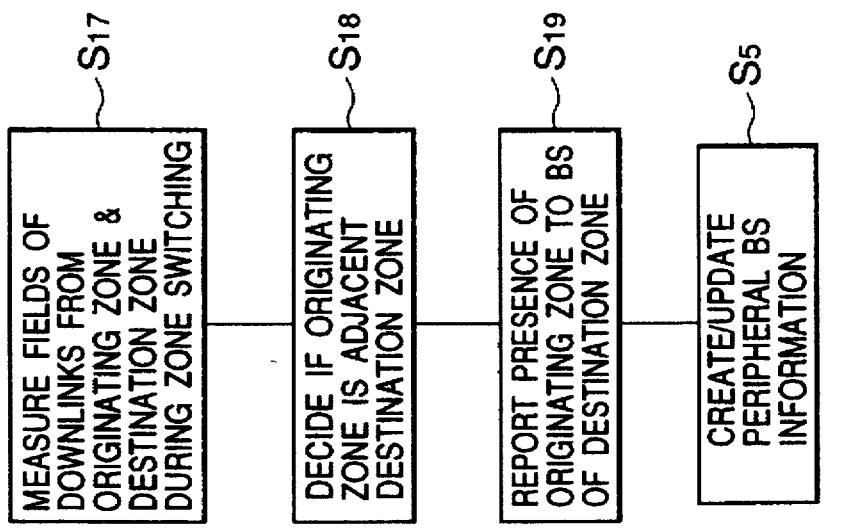
FIG. 4B is a flowchart showing the procedure of the method according to the fifth aspect of the present invention.
Figure 4A:
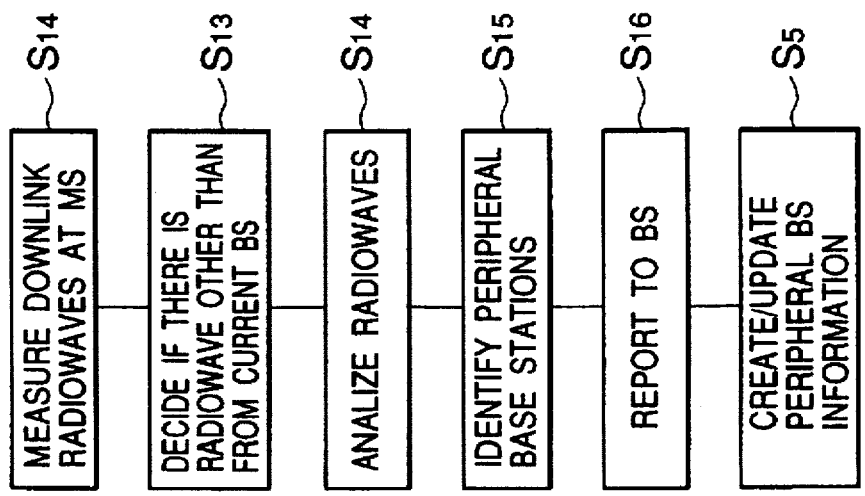
FIG. 4A is a flowchart showing the procedure of the method according to the fourth aspect of the present invention.

D. Where the mobile station autonomously measures the field intensity of received rediowaves and analyzes them and reports the results:

With the method according to the fourth aspect of the present invention, as shown in FIG. 4A, the mobile station MS periodically receives downlink rediowaves other than those from the base station $BS_i$ of the visiting zone $Z_i$, then measures their field intensity ($S_{M1}$) and checks them for downlink rediowaves other than those from the base station $BS_i$ of the visiting zone $Z_i$ ($S_{M2}$). If there are detected the downlink rediowaves other than those from the visiting zone base station $BS_i$, the mobile station MS lists them and analyzes each rediowave to see if it is a rediowave of a control channel in the same mobile radio communication system ($S_{M3}$). Then, when the number of base stations peripheral to the base station $BS_i$ of the visiting zone $Z_i$ is limited, the mobile station MS judges a smaller number of base stations as being peripheral ones ($S_{M4}$) and reports the information to the visiting zone base station $BS_i$ ($S_{M5}$). Based on the report, the base station $BS_i$ creates or updates the peripheral base station information ($S_{B1}$).

E. Where at the time of entering a new zone the mobile station measures the field intensity of received radio waves, then analyzes them and reports the results to the base station of the new zone:

With the method according to the fifth aspect of the present invention, as depicted in FIG. 4B, when entering a new zone, the mobile station MS measures the field intensity of downlink control channel rediowaves of the base stations of the old and new zones ($S_{M1}$) and, based on the measured results, makes a check to determine if the old zone is peripheral to the new zone ($S_{M2}$). If so, the mobile station reports the presence of the old zone to the base station of the new zone ($S_{M3}$). The base station of the new zone uses the reports to create or update the peripheral base station information ($S_{B1}$).

F. Where at the time of entering a new zone the mobile station measures the field intensity of received radio waves and the base station of the new zone analyzes the received rediowaves:

With the method according to the sixth aspect of the present invention, as depicted in FIG. 4C, when entering a new zone, the mobile station MS measures the field intensity of downlink control channel rediowaves from the base stations of the old and new zones ($S_{M1}$) and reports the measured results to the base station of the new zone ($S_{M2}$). The base station of the new zone uses the report to decide whether the old zone is peripheral to the new zone ($S_{B1}$) and creates or updates the peripheral base station information accordingly ($S_{B2}$).

G. Combinations of the methods

With the method according to the seventh aspect of the present invention, a given number of first through sixth methods are combined. For example, the method that the mobile station analyzes the downlink rediowaves from base stations other than those from the visiting zone base station on the basis of their field intensity measured by the visiting zone base station according to the second aspect is used in combination with the method that the mobile station MS autonomously measures the downlink rediowaves other than those from the visiting zone base station according to the third aspect of the invention. The method according to the seventh aspect may also be combined with the method according to the sixth aspect of the invention.

The present invention described above brings about such effects as listed below.

(a) Since the afore-mentioned measurement and evaluation can be done during operation of the mobile radio communication system and an abnormality in the peripheral base station information can be detected in a short time, it is possible to automatically follow changes of adjacent base stations caused by changes in the environment or changes in the base station arrangement pattern—this eliminates the necessity of management control via a centralized control device or management by an operator.

(b) An abnormality in downlink rediowaves from other base stations which are not to be adjacent base station is autonomously detected; hence, by pre-assigning a plurality of selectable frequencies to each base station, it is possible for the base station itself to switch to a selected one of the frequencies according to the severity of the abnormality.

(c) No base station setup plan is needed since adjacent base stations can be changed following changes in the environment.

(d) Since a base station is found which is peripheral to the base station concerned though distant therefrom because of overlapping of their zones (service areas), their special zoning such as three-dimensional placement and the reflection of rediowaves and their complicated propagation paths, it is possible to recognize highly accurate peripheral zone conditions.

(e) Usually, the reception limit of the receiver of the radio base station is defined by the field intensity of rediowaves that are radiated from within its coverage or service area. For this reason, the base station cannot receive rediowaves radiated from the outside of the visiting zone since their field intensity is lower than the limit of the receiving performance of the receiver. An expansion of the receiving performance of such a receiver for receiving rediowaves of extremely low field intensity, for instance, is very likely to make the receiver complicated in construction, expensive and bulky. With the methods according to the third through sixth aspects of the present invention, however, the reception range of the radio base station is significantly enlarged for many purposes by the combined use of the mobile station, making it possible to provide for increased accuracy.

Figure 5:
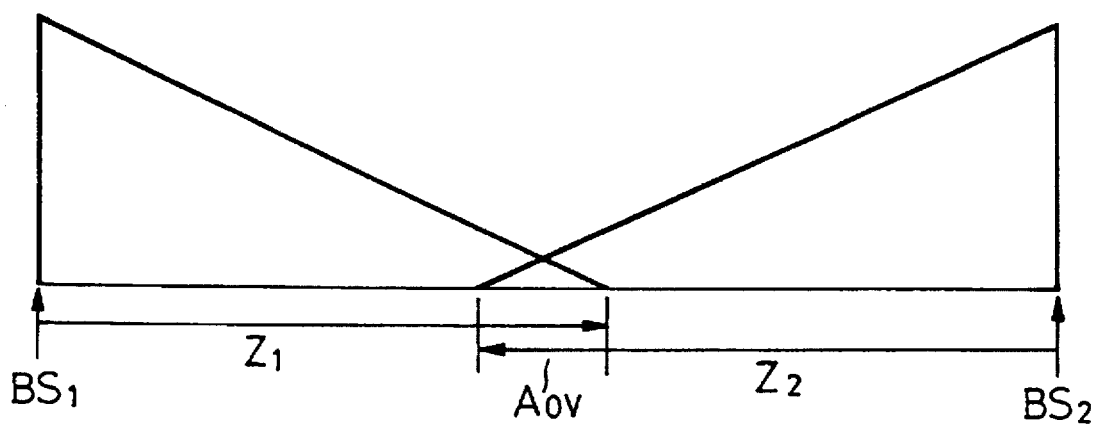
FIG. 5 is a diagram showing the relationship between adjacent base stations and their service areas.

That is, as shown in FIG. 5, boundary portions of the zones (service areas) $Z_1$ and $Z_2$ of base stations $BS_1$ and $BS_2$ overlap; a mobile station in the overlapping area $A_{ov}$ is capable of receiving downlink rediowaves from both of the base stations $BS_1$ and $BS_2$, which are, in turn, capable of receiving uplink rediowaves from the mobile station at the lowest receivable field intensity. Hence, when the base station $BS_1$ receives the downlink rediowaves from the base station $BS_2$, the afore-mentioned problems arise, but the use of the mobile station enables the base station $BS_1$ to measure the field intensity of the downlink rediowaves from the base station $BS_2$ in the area $A_{ov}$, i.e. in the visiting zone $Z_1$ through the mobile station. This equivalently doubles the reception range of the base station $BS_1$.

It will be apparent that many modifications and variations may be effected without departing from the scope of the novel concepts of the present invention.

What is claimed is:

1. A method for creating peripheral zone information by each radio base station disposed in one of a plurality of zones forming the service area of a mobile radio communication system, comprising the steps of:

(a) measuring the field intensity of downlink radiowaves of all frequencies in each of said plurality of zones and deciding whether said field intensity is above a prescribed value;

(b) analyzing those downlink radiowaves having the field intensity above said prescribed value and deciding whether they are radiowaves of said mobile radio communication system; and (c) creating frequency channel information of peripheral base stations as said peripheral zone information on the basis of the frequency channels of said radiowaves decided to be those used in said mobile radio communication system.

2. A method for creating peripheral zone information by each radio base station disposed in one of a plurality of zones forming the service area of a mobile radio communication system, comprising the steps of:

(a) measuring, at each of said radio base stations, the field intensity of radiowaves of all frequency bands other than those from said each radio base station;

(b) deciding whether there exist downlink radiowaves around said each radio base station on the basis of the measured results;

(c) analyzing, at said each radio base station, said radiowaves decided to exist as to whether they are radiowaves that are used in said mobile radio communication system;

(d) deciding on the basis of the analyzed results as to whether radio base stations radiating such radiowaves are peripheral base stations; and (e) recognizing the peripheral base station condition around said each radio base station and creating and updating peripheral base station information as said peripheral zone information on the basis of said measured and analyzed results.

3. A method for creating peripheral zone information by each radio base station disposed in one of a plurality of zones forming the service area of a mobile radio communication system, comprising the steps of:

(a) measuring, at said each radio base station, the field intensity of radiowaves of all downlink frequency bands other than that of a downlink frequency of said each radio base station;

(b) deciding on the basis of the measured results as to whether there exist downlink radiowaves around said each radio base station;

(c) requesting, at said each radio base station, a mobile station to analyze whether said radiowaves decided to exist are radiowaves used in said mobile radio communication system;

(d) analyzing, at said mobile station, whether said radiowaves are those used in said mobile radio communication system;

(e) reporting the analyzed results from said mobile station to said each radio base station;

(f) deciding, at said each radio base station, whether radio base stations radiating said radiowaves are peripheral base stations on the basis of said analyzed results; and (g) recognizing the peripheral base station condition around said each radio base station and creating and updating peripheral base station information as said peripheral zone information on the basis of said measured and analyzed results.

4. A method for creating peripheral zone information by each radio-base station disposed in one of a plurality of zones forming the service area of a mobile radio communication system, comprising the steps of:

(a) measuring at a mobile station the field intensity of radiowaves of all frequencies other than that of a downlink frequency of a radio base station of the mobile station's visiting zone;

(b) reporting the measured results to said radio base station of said visiting zone;

(c) checking, said measured results, at said radio base station receiving said report for radiowaves above a predetermined field intensity value, then if they exist, specifying the frequencies of such radiowaves and requesting said mobile station to analyze whether said radiowaves above said predetermined field intensity value are those used in said mobile radio communication system;

(d) analyzing said radiowaves of said specified frequencies at said mobile station;

(e) reporting the analyzed results from said mobile station to said requesting radio base station;

(f) deciding, at said radio base station, whether radio base stations radiating said radiowaves of said specified frequencies are peripheral base stations on the basis of said measured and analyzed results; and (g) recognizing the peripheral base station condition around said radio base station and creating and updating peripheral base station information as said peripheral zone information.

5. A method for creating peripheral zone information by each radio base station disposed in one of a plurality of zones forming the service area of a mobile radio communication system, comprising the steps of:

(a) autonomously measuring the field intensity of radiowaves of all downlink frequency bands at a mobile station;

(b) deciding whether there exist downlink radiowaves from other base stations peripheral to that of the mobile station's visiting zone on the basis of the measured results;

(c) autonomously analyzing at said mobile station whether the radiowaves decided to exist are those used in said mobile radio communication system;

(d) recognizing at said mobile station the peripheral base station condition around said radio base station of said visiting zone on the basis of said analyzed results;

(e) reporting information about said peripheral base station condition from said mobile station to said radio base station of said visiting zone; and (f) creating and updating, at said radio base station, peripheral base station information as said peripheral zone information on the basis of said reported information.

6. A method for creating peripheral zone information by each radio base station disposed in one of a plurality of zones forming the service area of a mobile radio communication system, comprising the steps of:

(a) At the time of entering a new zone from a current visiting zone, a mobile station measures the field intensity of downlink control channel radiowaves from a radio base station of said current visiting zone and the field intensity of downlink control channel radiowaves from a radio base station of said new zone;

(b) deciding whether said current visiting zone is a zone peripheral to said new zone on the basis of the measured results;

(c) reporting the presence of said radio base station of said current visiting zone to said radio base station of said new zone if the former is decided to be peripheral to the later; and (d) creating and updating, at said radio base station of said new zone, peripheral base station information as said peripheral zone information on the basis of said report.

7. A method for creating peripheral zone information by each radio, base station disposed in one of a plurality of zones forming the service area of a mobile radio communication system, comprising the steps of:

(a) at the time of entering a new zone a the current visiting zone, a mobile station measures the field intensity of downlink control channel radiowaves from a radio base station of said current visiting zone and the field intensity of downlink control channel radiowaves from a radio base station of said new zone;

(b) reporting the measured results from said mobile station to said radio base station of said new zone; and (c) deciding, at said radio base station of said new zone, whether said radio base station of said current visiting zone is peripheral thereto and creating and updating peripheral base station information as said peripheral zone information on the basis of said measured results.

8. The method of claim 3, further comprising the steps of:

(h) measuring, at a mobile station staying in the zone of said each radio base station, the field intensity of radiowaves frequencies other than the downlink frequency of said each radio base station of said zone;

(i) reporting the measured results from said mobile station to said each radio base station of said zone;

(j) deciding, at said each base station, whether said mobile station is capable of analyzing said field-intensity measured radiowaves and if said mobile station is decided to be capable of making said analysis, specifying the frequencies of said radiowaves and requesting said mobile station to analyze whether said radiowaves of said specified frequencies are those used in said mobile radio communication system;

(k) analyzing said radiowaves of said specified frequencies at said mobile station;

(l) reporting the analyzed results from said mobile station to said each radio base station;

(m) deciding, at said each radio base station having received said report, whether radio base stations radiating said radiowaves of said specified frequencies are peripheral thereto on the basis of said reported analyzed results; and (n) recognizing, at said each base station, the peripheral base station condition around it and creating and updating peripheral base station information as said peripheral zone information.

9. The method of claim 8, further comprising the steps of:

(o) at the time of entering a new zone from the current visiting zone, a mobile station measures the field intensity of downlink control channel radiowaves from a radio base station of said current visiting zone and the field intensity of downlink control channel radiowaves from a radio base station of said new zone;

(p) reporting the measured results from said mobile station to said radio base station of said new zone; and (q) deciding, at said radio base station of said new zone, whether said radio base station of said current visiting zone is peripheral thereto and creating and updating peripheral base station information as said peripheral zone information on the basis of said measured results.

* * * * *